(12) United States Patent
Vallone

(10) Patent No.: US 7,330,894 B2
(45) Date of Patent: Feb. 12, 2008

(54) SYSTEM AND METHOD FOR PREVENTING TIMEOUT OF A CLIENT

(75) Inventor: Mark C. Vallone, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 660 days.

(21) Appl. No.: 10/126,484

(22) Filed: Apr. 19, 2002

(65) Prior Publication Data

US 2003/0200255 A1 Oct. 23, 2003

(51) Int. Cl.
*G06F 15/16* (2006.01)
*G06G 3/00* (2006.01)

(52) U.S. Cl. ............... 709/227; 709/203; 719/318
(58) Field of Classification Search ............ 709/227, 709/203; 719/318
See application file for complete search history.

(56) References Cited

U.S. PATENT DOCUMENTS

| 6,119,165 | A * | 9/2000 | Li et al. ............... 709/229 |
| 6,205,474 | B1 * | 3/2001 | Hurley ................ 709/218 |
| 6,353,853 | B1 * | 3/2002 | Gravlin ................ 709/219 |
| 6,480,883 | B1 * | 11/2002 | Tsutsumitake .......... 709/203 |
| 6,526,433 | B1 * | 2/2003 | Chang et al. ........... 709/201 |
| 6,539,422 | B1 * | 3/2003 | Hunt et al. ............ 709/217 |
| 2002/0006603 | A1 * | 1/2002 | Peterson et al. ........ 434/365 |
| 2002/0169670 | A1 * | 11/2002 | Barsade et al. ......... 705/14 |
| 2002/0180795 | A1 * | 12/2002 | Wright ................ 345/772 |
| 2003/0018887 | A1 * | 1/2003 | Fishman et al. ........ 713/151 |
| 2003/0046401 | A1 * | 3/2003 | Abbott et al. .......... 709/228 |
| 2003/0070000 | A1 * | 4/2003 | Coker et al. .......... 709/318 |
| 2003/0146932 | A1 * | 8/2003 | Weng et al. ........... 345/748 |

* cited by examiner

*Primary Examiner*—William Vaughn
*Assistant Examiner*—Ranodhi Serrao
(74) *Attorney, Agent, or Firm*—Shelly M. Beckstrand

(57) ABSTRACT

A system for preventing timeout of a client interface accessing a main Java Servlet executing in a first thread which monitors an application executing in a second thread. A task status object is accessed by the application to post its completion state and by the client interface responsive to a state refresh request to post a state refresh response including the completion state to the client. The state refresh response selectively includes a refresh attribute instructing the client to periodically post the state refresh request. Upon the application going to completion or error state, subsequent state refresh responses do not include the refresh attribute.

16 Claims, 6 Drawing Sheets

SYSTEM AND METHOD FOR PREVENTING TIMEOUT OF A CLIENT

BACKGROUND OF THE INVENTION

1. Technical Field of the Invention

This invention relates to preventing timeout. More particularly, it relates to preventing timeout of a browser in a client/server system.

2. Background Art

Java Servlets are used in conjunction with web browsers. The web browser acts as the client. The servlet resides on the server side. When an event occurs on a web page, such as clicking on a "submit" button, user-entered data on the page, such as information to make an on-line purchase of goods, may be sent to the servlet for processing. The servlet then receives that data and takes appropriate actions, such as verifing the credit card number and checking inventory to make sure the purchase can be fulfilled.

If the servlet takes a lengthy period of time to process that data, the web browser may time-out and show an error message to the effect that the page being requested can not be obtained or that communication was lost with the web server. The servlet will eventually finish processing the user's data, but because of the timeout, the web page that the servlet returns to the browser after the data has been processed will go undisplayed.

Even if the data is able to be processed within the time-out period enforced by the browser, the processing may still be lengthy. Without a monitoring system that uses words and/or a pictorial to indicate the progress of the data processing to the user, the user would only see an hourglass while the mouse is hovering over the browser. This has been a source of frustration for users encountering this phenomenon.

It is an object of the invention to provide a system and method for avoiding premature timeout of a browser while awaiting completion of an application.

SUMMARY OF THE INVENTION

A system and method for preventing timeout by initializing an application for execution; initializing a client state with a refresh attribute, the refresh attribute specifying a time interval for posting state refresh requests; responsive to the state refresh request from the client, returning to the client a refreshed application state selectively including a refresh attribute while the application is executing and not including the refresh attribute upon said application completing execution or going into an error state.

Other features and advantages of this invention will become apparent from the following detailed description of the presently preferred embodiment of the invention, taken in conjunction with the accompanying drawings.

DETAILED DESCRIPTION OF PREFERRED EMBODIMENTS

In accordance with the preferred embodiment of the invention, a system and method for monitoring task progress in a Java servlet is used to avoid premature timeout of a browser. In an exemplary embodiment, on periodic request from the browser, a bar graph representation of percentage of the task completion is returned from the servlet in a hypertext language markup, such as a JavaScript/HTML markup, on short time intervals (i.e., every 5 seconds). This bar graph can also be accompanied by text displaying any pertinent progress information. The instruction to request an updated representation of the progress is received by the browser in a meta tag from the servlet. This time interval is set to be less than the browser time-out value, so the browser will never time-out. The progress representation allows the user to see and understand how much progress has been made in completing the task, the browser does not timeout, and the user can estimate when the task will be completed.

Figure 1:
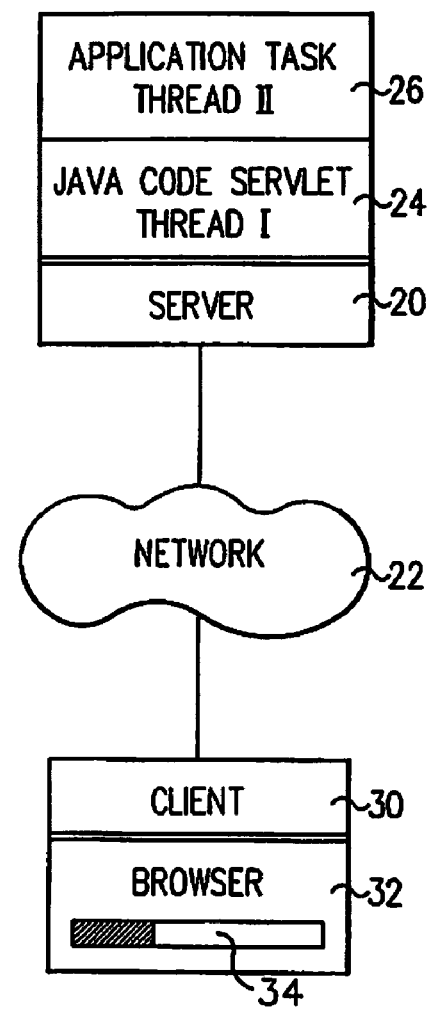
FIG. 1 represents a server/client system in accordance with the preferred embodiment of the invention.

Referring to FIG. 1, server 20 and client 30 are coupled through a network 22. Server 20 has a servlet 24 running in thread I and an application task 26 running in thread II. Client 30 has a browser, in which progress bar 34 may be displayed responsive to servlet 24 indicating the state of completion of application task 26 in thread II.

In accordance with the preferred embodiment of the invention, a meta tag is sent by servlet 24 in a first thread to keep a browser 32 from timing out during execution of application task 26 in a second thread.

A meta tag is a piece of html markup that describes a document, and can define an interval that sets a refresh interval: after that interval, a client returns to the server to get a new copy of the page being displayed at client. This meta tag is an existing part of html, and is used by the preferred embodiment of the present invention to refresh an html page with information from a Java servlet.

HTML and JavaScript at client browser displays progress bar/text at browser. Each time interval t the client goes to the server servlet 24 for an update for the progress bar 34. That progress bar is tracking the progress of an application on a separate thread II.

Servlet 24 responds by building a new HTML page with JavaScript to send back to client 30 a new display for browser display 32 with progress bar 34 updated to reflect current progress of application 26. When application 26 on thread II completes or goes to error state, the response from servlet 24 does not include the meta tag—so the page is done and no further refreshing is done in response to a meta tag.

Figure 2:
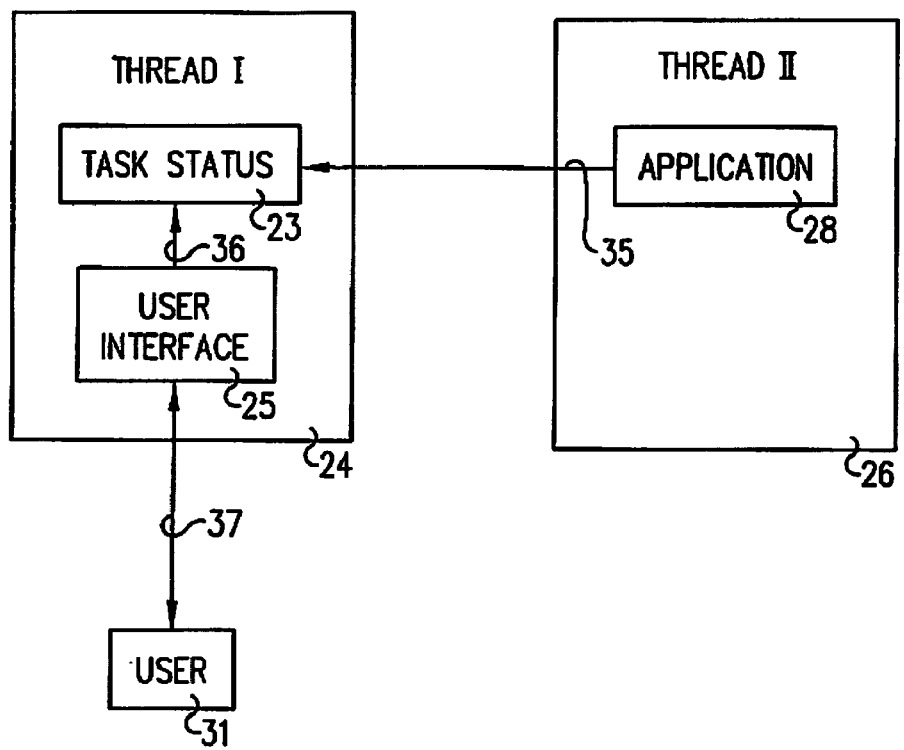
FIG. 2 is a diagrammatic representation of the threads of FIG. 1.

Referring to FIG. 2, application 28 runs in thread II 26, and as is represented by line 35 periodically posts its status (completion or error state) to task status 23, which runs in thread I 24. Thread I also includes user interface 25. As is represented by line 36, user interface accesses task status 23 to ascertain the current status of application 28. As is represented by line 37, user interface initializes user 31 to an initial state which includes a meta tag having a refresh attribute t. As is further represented by line 37, user 31, responsive to that refresh attribute t, periodically posts a refresh request to user interface 25, which responds with a new state including an updated representation of the status of application 28. Until application 28 posts completion or error to task status 23, user interface 25 will respond to refresh requests from user 31 with a state refresh that includes the refresh attribute. Upon task status 23 being posted by application 28 to error or complete state, the response from user interface 25 to user 31 will not include the refresh attribute t and user 31 ceases posting periodic refresh requests to user interface 25. Refresh attribute t is set at a time interval less than the timeout period for user 31 so that, as long as user 31 receives and responds to a state refresh including the meta tag, user 31 will not timeout.

Figure 3A:
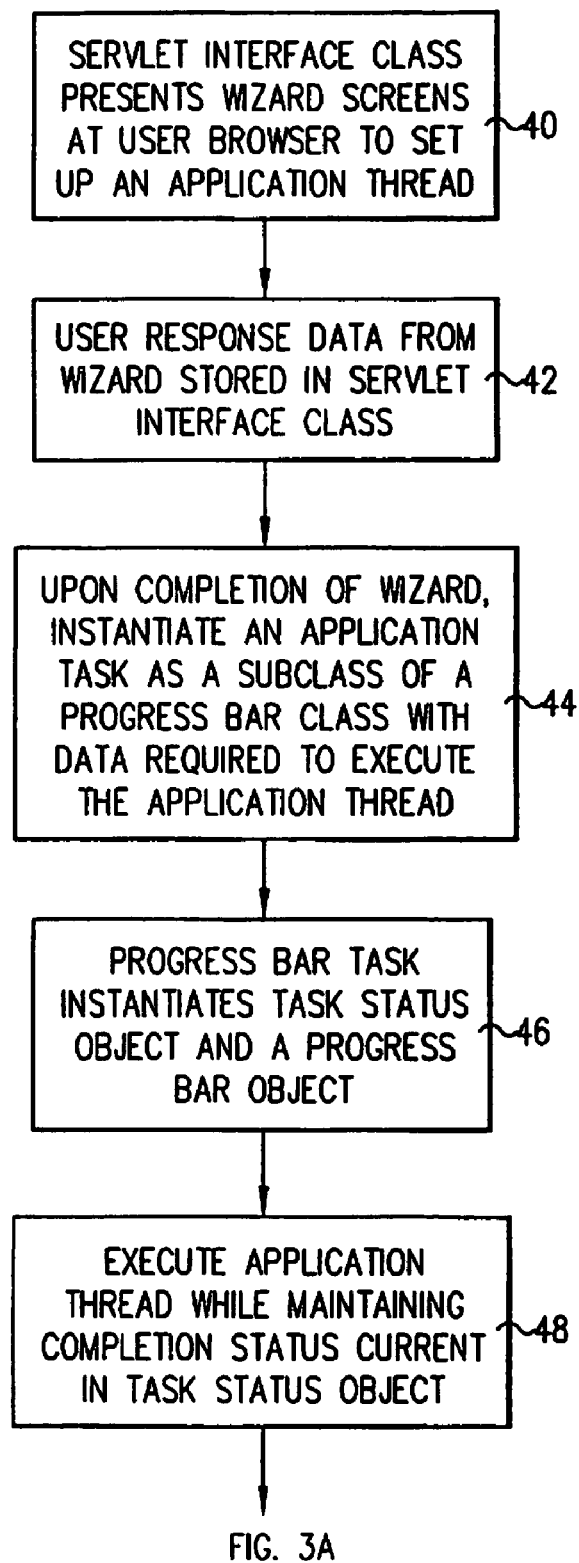
FIGS. 3A-3C are a flow chart of an exemplary embodiment of the method of the invention.
Figure 3B:
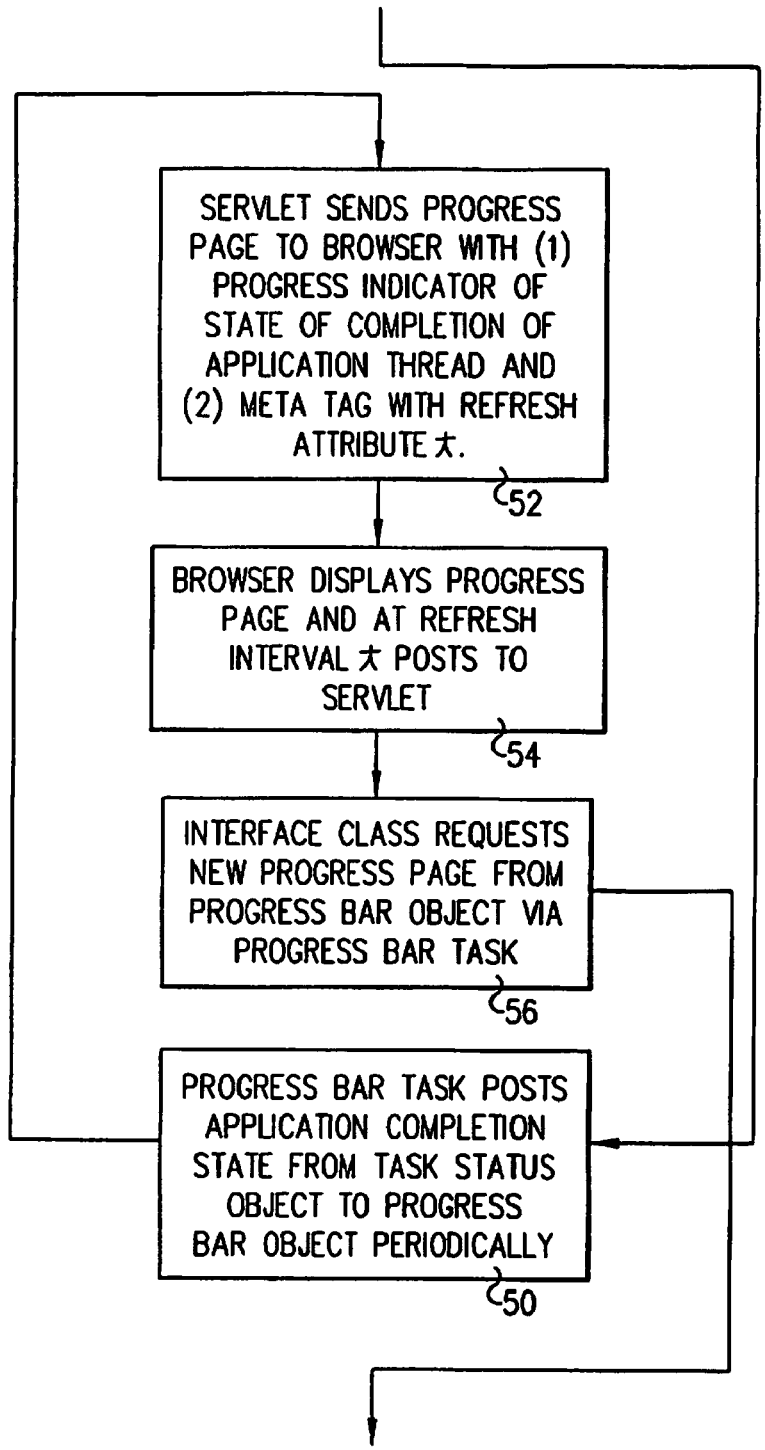
Figure 3C:
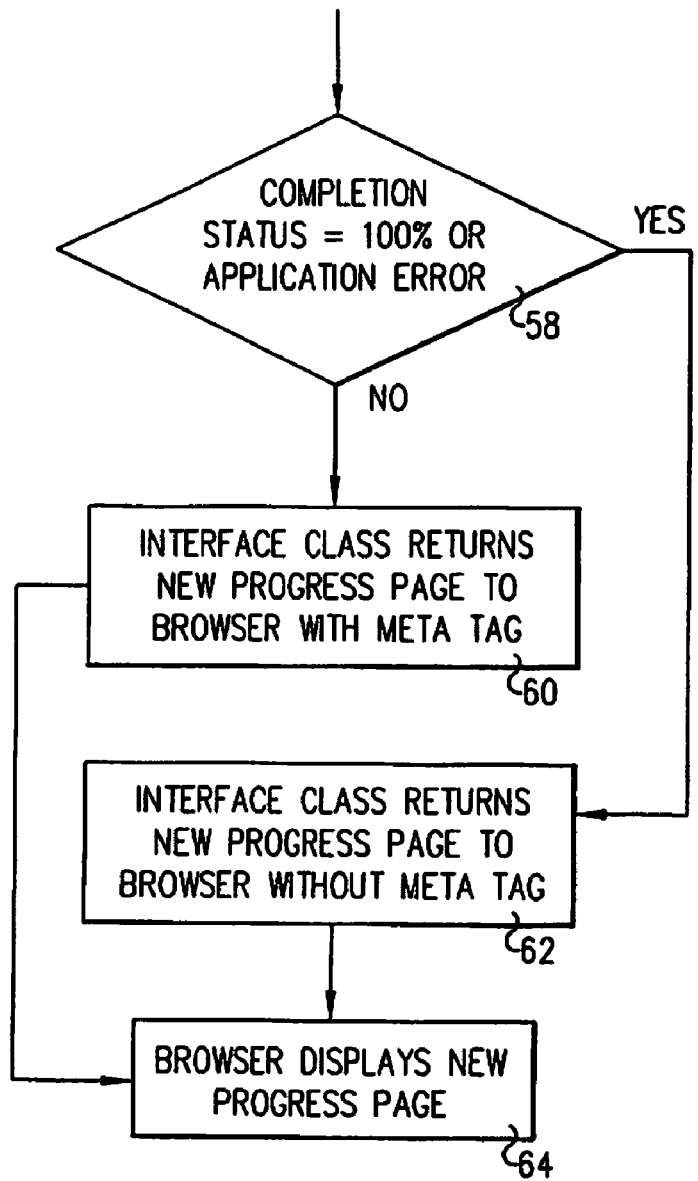

Referring to FIGS. 3A-3C in connection with FIG. 1, an exemplary embodiment of the invention is presented. In step 40, a Java user interface class presents a series of HTML screens (a wizard) to the user, each for collecting data from him for setting up an application task 28 in thread II. Between each screen, in step 42, the data on the page is submitted to the Java Servlet 24 and is stored in this Java class. In an exemplary embodiment, this servlet class 24 is represented by B2BCatalogPublishWizardForm. Once all data has been collected from the user, in step 44, a subclass of ProgressBarTask is created (in this example, Publish-Task). All data needed to perform the publish task is passed on to this newly created object.

In step 46, the new ProgressBarTask creates a TaskStatus object, which holds the percentage complete of the task to run, and some message text set by the object user. The ProgressBarTask also owns a ProgressBar object.

Once all data is sent to the ProgressBarTask subclass (i.e. PublishTask) from the user interface class, the actual long task (such as a publishing application 28) is ready to be run. In step 48, application task 28 is run in a separate thread II from servlet 24, which runs in thread I. The ProgressBarTask subclass object is sent to the classes handling the long operation (publish) in that separate thread. Those classes are in charge of using the PublishTask object to set the TaskStatus that it owns with new percentages and messages when it reaches specific milestones. In step 50, updates to task status are periodically posted to the progress bar object by progress bar task. This is the data that will be read every t seconds when an update is required. In step 52, servlet 24 sends to browser 32 an HTML page with progress indicator 34 (initially set to 0% completion) and a meta tag with a refresh attribute of t. In step 54, browser 32 displays progress bar 34.

In step 56, periodically, such as when an update is required to the HTML page with progress indicator 34, the ProgressBar task takes the data from the TaskStatus object, and gives it to the ProgressBar object. The ProgressBar object uses that data to create a new HTML page to be returned in step 60 by the Java Servlet 24 to browser 32. In step 60, this HTML page contains a meta tag with a refresh attribute set to a default of t seconds. This will cause in step 54 a post to the Java Servlet 24 in t seconds, causing in step 56 the user interface class (i.e. B2BCatalogPublishWizardForm) to ask the ProgressBar-Task subclass to get a new HTML page from ProgressBar. The meta tag with the refresh attribute is returned in step 60 in the HTML markup until in step 58 an error in or completion of task 26 is detected and, at that time, in step 62 the interface returns the HTML markup without the meta tag. This prevents an infinite refresh of the progress HTML page. When all updates are finished, in step 64 a button is presented on the HTML page that takes the user to another page so that he can continue with his use of the browser.

Summarizing, in this embodiment of the invention, a ProgressBarTask subclass is shared between two threads I and II. Thread I consumes the TaskStatus data from it, and user interface thread II updates it. Thread I is the user interface class which can make calls to get a new HTML page to show the user the current task status, and the thread II is the class or classes performing the actual task 26.

Figure 4:
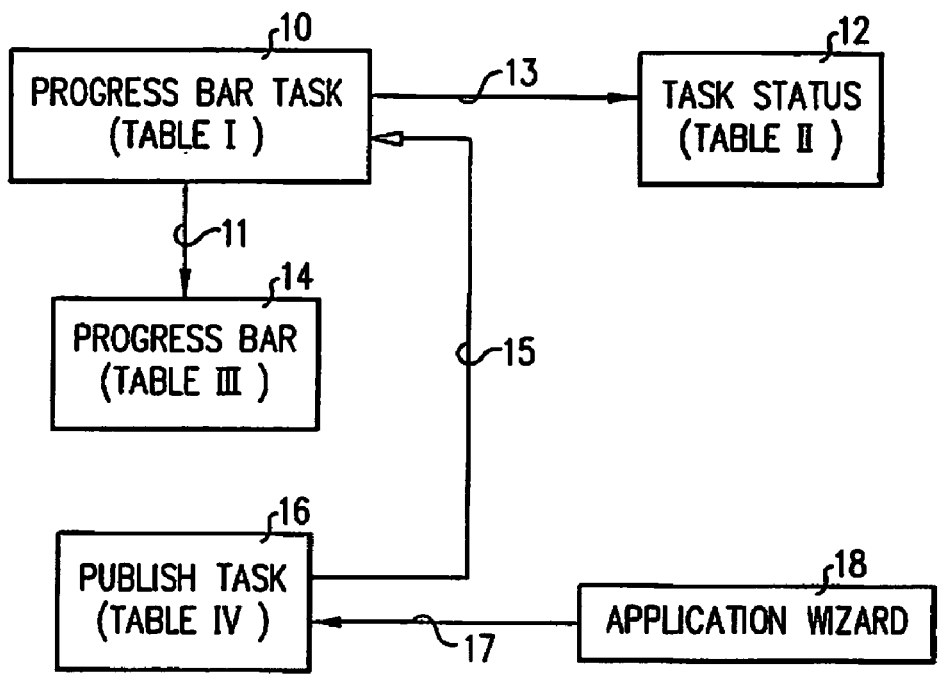
FIG. 4 is class diagram illustrating thread I of FIG. 2.

The object model of FIG. 4 and Tables I-IV illustrate how a progress indicator meta tag having a refresh attribute is used to prevent browser time-out during application execution when publishing large electronic catalog in Connect for the IBM iSeries. All objects of FIG. 4 reside within Java servlet 24 (iSeries Connect is one Java Servlet). The Java code of Tables I-IV illustrate an exemplary embodiment of the invention for iSeries Connect.

Referring to FIG. 4, a class diagram illustrates progress bar task 10 (Table I), task status 12 (Table II), progress bar 14 (Table III), publish task 16 (Table IV), and application wizard 18. As is represented by line 11, progress bar task class 10 has a progress bar class 14. As is represented by line 13, progress bar task class 10 has a task status class 12. As is represented by line 15, publish task 16 extends progress bar task class 10. As is represented by line 17, application wizard class 18 has a publish task class 16.

Progress bar task class 10 returns html to browser 32 which contains progress bar 34 information. Table I sets forth a Java code statement of an exemplary progress bar task class 10.

TABLE I

| PROGRESSBAR TASK |
| --- |
| #status:TaskStatus |
| #progressBar:ProgressBar |
| #m_taskException:B2BCatalogExeption=null |
| #m_trace:B2BServletTraceLogger |
| #m_catBundle:CatalogResourceBundle |
| #ProgressBarTask( ) |
| #ProgressBarTask(refreshRate:int) |
| +getProgressHTML( ):String |
| +getProgressHTMLForError( ):String |
| +getStatus( ):TaskStatus |
| +getTaskException( ):B2BCatalogException |
| +setTaskException(taskException:B2BCatalogException) |

Task status class 12 contains information on how complete is thread II 26, or its error state. A Java code representation of an exemplary task status class 12 is set forth in Table II.

TABLE II

| TASKSTATUS |
| --- |
| −m_statusMsg:String="" |
| −m_percentComplete:Integer |
| −m_onLastStep:Boolean |
| −m_catBundle:CatalogResourceBundle |
| +TaskStatus( ) |
| +setTaskStatus(statusMsg:String,percentComplete:int):void |
| +onLastStep( ):boolean |
| statusMsg:String |
| percentComplete:int |
| onLastStep:boolean |

Progress bar class 14 is a data holder for the refresh rate on the meta tag of browser 32, and is also used as an interface to update application task 28 thread II 26 progress. A Java code representation of an exemplary progress bar class 14 is set forth in Table III.

TABLE III

| PROGRESS BAR |
| --- |
| −REFRESH_URL:String=B2BPaths.getServletURLpath( )+"/Content" |
| −m_refreshRate:Int=5 |
| −m_trace:B2BServletTraceLogger |
| −m_catBundle:CatalogResourceBundle |
| −progressHTMLStr:String |

TABLE III-continued

PROGRESS BAR

+ProgressBar( )
+ProgressBar(refreshRate:int)
+updateProgress(percentComplete:int,statusMsg:String,
    isFinalStep:boolean):String
+updateProgress(percentComplete:int,statusMsg:
    String,errorOccurred:boolean,isFinalStep:boolean)
refreshRate:Int Publish task class 16 is an extended class of progress bar task class 10 with specific information for application task 28 thread II 26 (what is it and what kind of data does it need.) A publish task is a subclass of progress bar task. It is needed because a publish is a long operation that needs to be monitored by a progress bar. The kind of data it needs, for example, is the catalog format that will be published, who the catalog supplier is, if it is a local or remote catalog, etc. Table IV contains a Java code representation of an exemplary publish task class 16.

TABLE IV

PUBLISH TASK

−m_mpFormat:MarketplaceFormat=null
−m_result:PublishResult=null
−m_catalog:Catalog=null
−m_associateMP:B2BSupplierMarketplaceAssociationElemen...
−m_priceProfiles:Vector=null
−m_destination:PublishDestination=null
−m_localOrRemote:int
−resultsSet:Boolean
−resultIsSet:Boolean
−m_catBundle: CatalogResourceBundle
+PublishTask(mpFormat:MarketplaceFormat)
+publish(catalog:Catalog,associateMP:
    B2BSupplierMarketplaceAssociation)
+run( ):void
publishResult:PublishResult Application wizard class 18 is a method for starting application task 28 thread II 26. Upon completing, application wizard class 18 induces progress bar 34. Class 18 is a wizard that interacts with the user to obtain information on how to publish, for example, an electronic catalog. At the end of the wizard, when a finish button is clicked, publish task class 16 is instantiated. An example of such a wizard is the B2BCatalogPublishWizardForm at com.ibm.connect.config.B2BWizardForm.

for the IBM iSeries Connect product, a product that allows suppliers to operate in secure market places to leverage the Internet. In publish task class 16, the statement +run( ):void is what spawns thread II 26.

When publish task class 16 is created, progress bar class 10 gets created as a consequence (publish task class 16 is a sub class of progress bar task 10). When progress bar task 10 is created, task status class 12 gets created as a consequence with an initial progress state of null. In publish task class 16, there is a run statement +run( ):void that spawns application task 28 in thread II 26 (the task that will take a long time (that is, a time longer than the timeout time of client browser 32), the progress of which will be displayed in progress bar 34.) At this point there exists a task (progress bar task 10) in application task 28 thread II 26, which has a reference to task status class 12 in a separate thread which updates task status whenever it is necessary. Both servlet thread 24 and application task 28 have access to task status class 12, with thread 24 being the consumer and thread 26 being the maintainer of task status class 12.

Thread II 26, once spawned, sets/resets its progress bar by executing the Java code +setTaskStatus(statusMsg:String.percentComplete:
        int):void on the task status class 12.

When task status class 12 is set up, no progress is complete, and a status bar 34 with zero complete is returned to client 30 by servlet thread 124 which includes the metatag to refresh the page. This metatag is contained in progress bar task class 10 at +getProgressHTML( ): String Application task 28 on thread II updates task status class 12, and progress bar task class 10 builds an HTML response to client 30 showing in the statement +getProgressHTML( ):String the new state of progress which had been set in task status class 12 by thread II 26 at +setTaskStatus(statusMsg:String.percentComplete:
        int):void That new +getProgressHTML( ):String includes a new meta tag which instructs client 30 to refresh again in time t.

If application task 28 on thread II is 100% complete or in error state, progress bar task class 10 returns HTML without the refresh meta tag and a progress bar which shows a completion or stopped state.

Advantages over the Prior Art

It is an advantage of the invention that there is provided a system and method for avoiding premature timeout of a browser while awaiting completion of an application.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as IBM Systems designated as zSeries, iSeries, series, and pseries, or the like and pursuant to one or more, or a part of one or more, program elements, modules or objects generated from any programming language, such as C++, Java, Pl./1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for preventing time out, comprising:
    initializing an application for execution in a server for responding to a first request from a client, wherein said client automatically times out if a response to said first request is not received in said client within a pre-determined time-out period;
    transmitting a server application state with a refresh attribute from said server to said client, said server application state specifying a state of progress of said application in generating said response to said first request, said refresh attribute specifying a time interval and causing said client to post a state refresh request for refreshing said server application state upon expiration of said time interval, said time interval being less than said pre-determined time-out period;
    receiving said state refresh request from said client in said server, said state refresh request being transmitted by said client before expiration of said pre-determined time-out period responsive to said refresh attribute specifying said time interval, wherein posting said state refresh request prevents time-out in said client; and
    responsive to said state refresh request from said client, returning to said client a refreshed server application state, said refreshed server application state selectively including said refresh attribute while said application is in the process of generating said response to said first request and not including said refresh attribute upon said application completing generation of said response to said first request or going into an error state.

2. The method of claim 1, further comprising:
    executing a client interface class in a first thread;
    executing said application in a second thread;
    maintaining a task status class accessible by said application for posting said state and by said client interface class for responding to said state refresh requests.

3. The method of claim 2, further comprising:
    posting said state to a progress bar task from said task status class;
    operating a publish task responsive to said state refresh request to access said progress bar task for said state of completion and derive a hypertext markup language representation of a progress bar for displaying said application state.

4. The method of claim 3, further comprising:
    operating said client responsive to said refresh attribute to periodically post said state refresh request to said client interface class.

5. The method of claim 4, further comprising:
    operating a browser at said client to display to a user said progress bar.

6. A method of claim 1, wherein said server application state comprises a hypertext markup language (HTML) metatag identifying a state of said application and containing said refresh attribute.

7. The method of claim 6, wherein said HTML metatag specifies a hypertext markup language representation of a progress bar for displaying state of completion of said application.

8. A program storage device readable by a machine, tangibly embodying a program of instructions executable by a machine to perform method steps for preventing time out, comprising:
    initializing an application for execution in a server for responding to a first request from a client, wherein said client automatically times out if a response to said first request is not received in said client within a pre-determined time-out period;
    transmitting a server application state with a refresh attribute from said server to said client, said server application state specifying a state of progress of said application in generating said response to said first request, said refresh attribute specifying a time interval and causing said client to post a state refresh request for refreshing said server application state upon expiration of said time interval, said time interval being less than said pre-determined time-out period;
    receiving said state refresh request from said client in said server, said state refresh request being transmitted by said client before expiration of said pre-determined time-out period responsive to said refresh attribute specifying said time interval, wherein posting said state refresh request prevents time-out in said client; and
    responsive to said state refresh request from said client, returning to said client a refreshed server application state, said refreshed server application state selectively including said refresh attribute while said application is in the process of generating said response to said first request and not including said refresh attribute upon said application completing generation of said response to said first request or going into an error state.

9. The program storage device of claim 8, said method further comprising:
    executing a client interface class in a first thread;
    executing said application in a second thread;
    maintaining a task status class accessible said application for posting said state and by said client interface class for responding to said state refresh requests.

10. The program storage device of claim 9, said method further comprising:
    posting said state to a progress bar task from said task status class;
    operating a publish task responsive to said state refresh request to access said progress bar task for said state of completion and derive a hypertext markup language representation of a progress bar for displaying said application state.

11. The program storage device of claim 10, the method further comprising:
    operating said client responsive to said refresh attribute to periodically post said state refresh request to said client interface class.

12. The program storage device of claim 11, said method further comprising:
    operating a browser at said client to display to a user said progress bar.

13. A program storage device of claim 8, wherein said server application state comprises a hypertext markup language (HTML) metatag identifying a state of said application and containing said refresh attribute.

14. The program storage device of claim 13, wherein said HTML metatag specifies a hypertext markup language representation of a progress bar for displaying state of completion of said application.

15. A method for operating a web server, comprising the computer-executed steps of:
- initializing a web server application for execution in said web server, said web server application for responding to a first request from a client, wherein said client automatically times out if a response to said first request is not received in said client within a pre-determined time-out period;
- transmitting a contending instance of a server application state from said web server to said client, said server application state comprising a hypertext markup language (HTML) metatag identifying a state of progress of said web server application in generating said response to said first request and containing a refresh attribute, said refresh attribute specifying a time interval and causing said client to post a state refresh request for refreshing said server application state upon expiration of said time interval, said time interval being less than said pre-determined time-out period;
- receiving said state refresh request in said web server, said state refresh request being received from said client responsive to said refresh attribute specifying said time interval, wherein posting said state refresh request prevents time-out in said client;
- repeating said transmitting step and said receiving step at least once while said web server application is in the process of generating said response to said first request, each instance of said transmitting step being repeated responsive to receiving a respective state refresh request in said web server from said client responsive to a respective said refresh attribute specifying said time interval, wherein posting each respective state refresh request prevents time-out in said client; and
- responsive to receiving an instance of said state refresh request in said web server after said web server application is no longer in the process of generating said response to said first request, transmitting a corresponding instance of said server application state from said web server to said client without said refresh attribute.

16. The method of claim 15, further comprising:
executing a client interface class in a first thread;
executing said web server application in a second thread;
maintaining a task status class accessible by said web server application for posting said server application state and by said client interface class for responding to said state refresh requests.

* * * * *